United States Patent [19]

Shiau

[11] Patent Number: 4,665,643
[45] Date of Patent: May 19, 1987

[54] FISHING SINKER WITH A VARIABLE PULLING POINT

[76] Inventor: Bor E. Shiau, 82, Jin Shyue Rd., Ta-Liau Shian, Kaohsiung Hsien, Taiwan

[21] Appl. No.: 832,059

[22] Filed: Feb. 24, 1986

[51] Int. Cl.⁴ .............................................. A01K 95/00
[52] U.S. Cl. ................................... 43/44.97; 43/42.23
[58] Field of Search .............................. 43/44.97, 42.23

[56] References Cited

U.S. PATENT DOCUMENTS

| | | | |
|---|---|---|---|
| 2,109,693 | 3/1938 | Gaines et al. | 43/44.97 |
| 2,502,875 | 4/1950 | Mortensen | 43/43.1 |
| 2,623,320 | 12/1952 | Bowman | 43/44.97 X |
| 3,413,751 | 12/1968 | Biddle | 43/44.97 |
| 3,823,503 | 7/1974 | Smith | 43/44.97 X |

Primary Examiner—Nicholas P. Godici
Assistant Examiner—Carmine Cuda
Attorney, Agent, or Firm—Holman & Stern

[57] ABSTRACT

A fishing sinker comprising a pair of coextensive sinker body members having a flat longer side and a flat shorter side forming an obtuse angle, a pin connecting the body members together with a gap therebetween, the pin positioned adjacent the obtuse angle, and a line attachment ring mounted on the pin in the gap being free to orbit on the pin and protruding from the sinker in at least one orientation.

3 Claims, 4 Drawing Figures

A —— A

FISHING SINKER WITH A VARIABLE PULLING POINT

BACKGROUND OF THE INVENTION

This invention concerns the structure of a fishing sinker. In order to make a fishing bait immersed down in the water and kept at a fixed depth, a sinker with a proper weight is needed to be fastened to the fishing line to enable the bait to roam within a proper limited range, especially where water flows rather rapidly. However, the sinker sometimes will drop on a craggy surface of a rock and be stuck in a gap so that the fishing line can not be pulled back unless it is cut off to discard the sinker.

SUMMARY OF THE INVENTION

In order to solve the problem in the art mentioned above, the present invention has been worked out to provide sinkers able to alter its center of gravity by the pulling force of the fishing line for the purpose to pull it up easily.

DETAILED DESCRIPTION OF THE INVENTION

Figure 1:
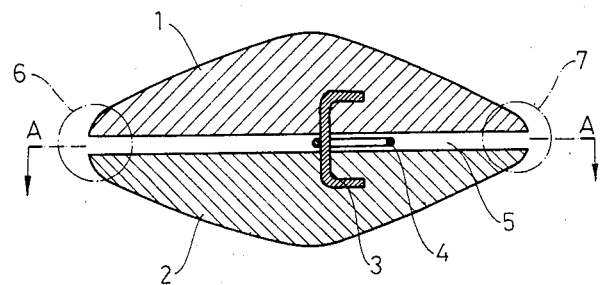
FIG. 1 is a vertical cross-sectional view of this invention.

First, as shown in FIG. 1, this invention, a fishing sinker consists of two sinker bodies 1, 2, a pin 3 and a ring 4.

The two sinker bodies 1, 2 are manufactured by casting. During the process of casting the sinker bodies 1, 2 each end of the pin 3 is set to be buried in each of them so as to combine together the two sinker bodies 1, 2 as one unit so that the ring 4 can be hooked by the pin 3 and turn around it. Each sinker body 1 or 2 is shaped as a rhombus and the ring 4 a long ellipse.

Figure 2:
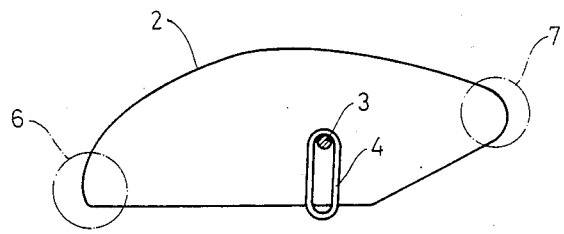
FIG. 2 is an A—A cross-sectional view of FIG. 1 in this invention.

Next, as shown in FIG. 2, a horisontal cross-sectioned view of the sinker bodies 1, 2, when the ring 4 has been hooked by the pin 3 and can turn around it, one side of the ring has to extend out of the sinker bodies 1, 2 for being fastened with a fishing line.

Figure 3:
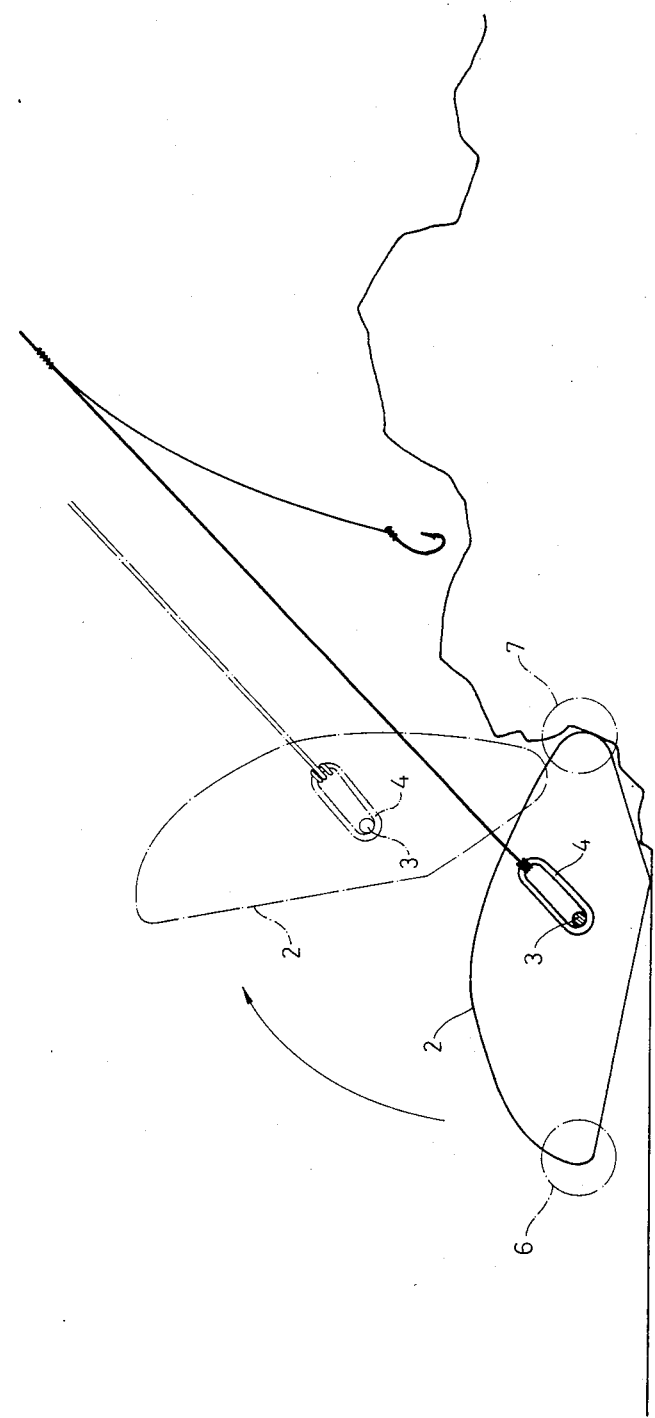
FIG. 3 is one view of a practical example using this invention.
Figure 4:
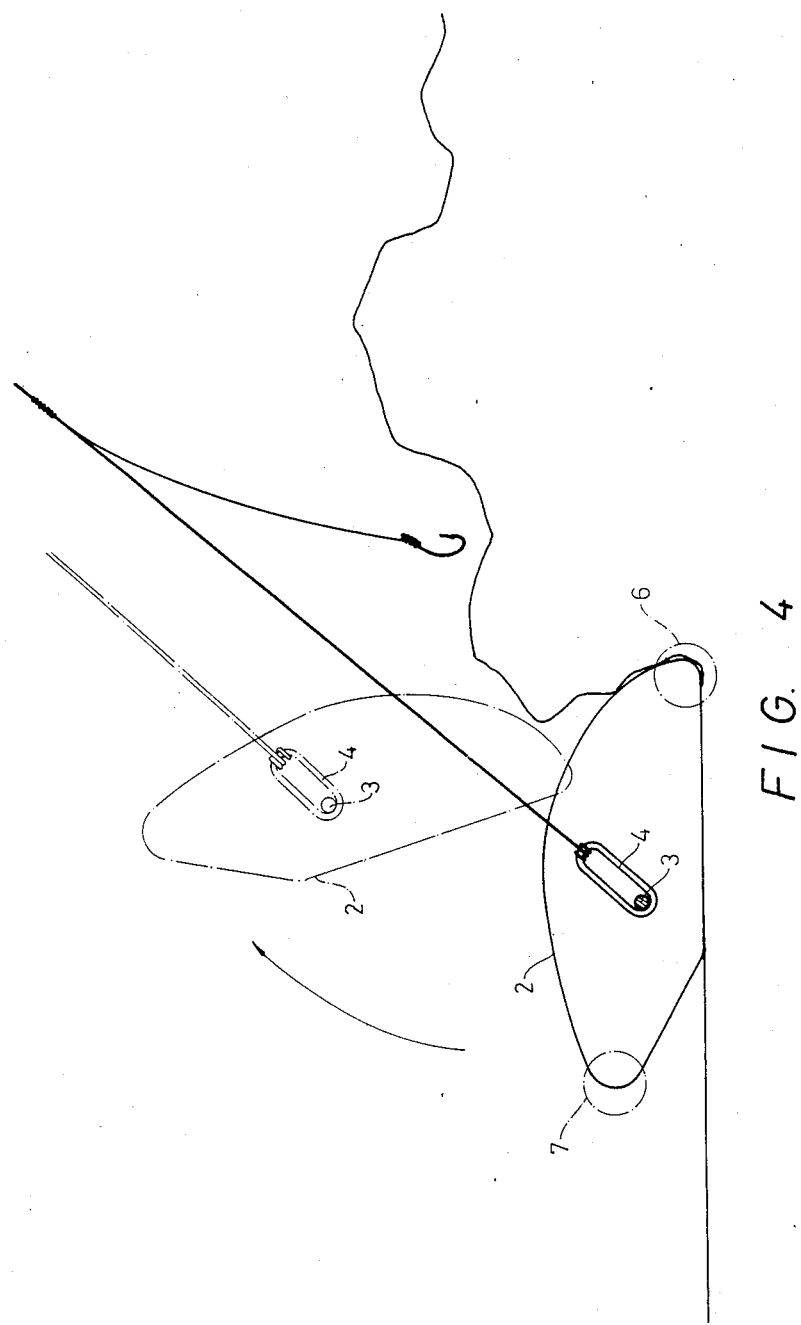
FIG. 4 is another view of a practical example using this invention.

FIGS. 3, 4 show that this sinker can have two different points 6, 7 for being stuck up in the rock. Therefore, the point 6, or 7 of the sinker when stuck up can regarded as a fulcrum and the pin is the pulling point where the fishing line is pulled. When the fulcrum and the pulling point do not come in a straight line, the pulling point will turn up resting on the fulcrum. As the fulcrum, the point were the sinker is stuck up, can change its location by the pulling of the fishing line, the sinker will gradually be turned and turned up and up to escape out of the rock.

What is claimed is:

1. A fishing sinker comprising a pair of substantially coextensive sinker body members each of generally rhombic shape having a flat longer side and a flat shorter side extending from one end of the longer side at an obtuse angle, a pin connecting the body members together with a gap therebetween, the pin being positioned with respect to said longer side of each body member at a location which is closer to said one end of the longer side than it is to an opposite end of the longer side, and a line attachment ring mounted on the pin in the gap between the body members, the ring being free to orbit on the pin and being dimensioned to protrude from the sinker at least in one orientation of the ring on the pin.

2. The invention as defined in claim 1 wherein the ring protrudes from the longer sides of the body members when in said one orientation on the pin.

3. The invention of claim 1 wherein the ring has a flattened elongated shape.

* * * * *